Figure 1:
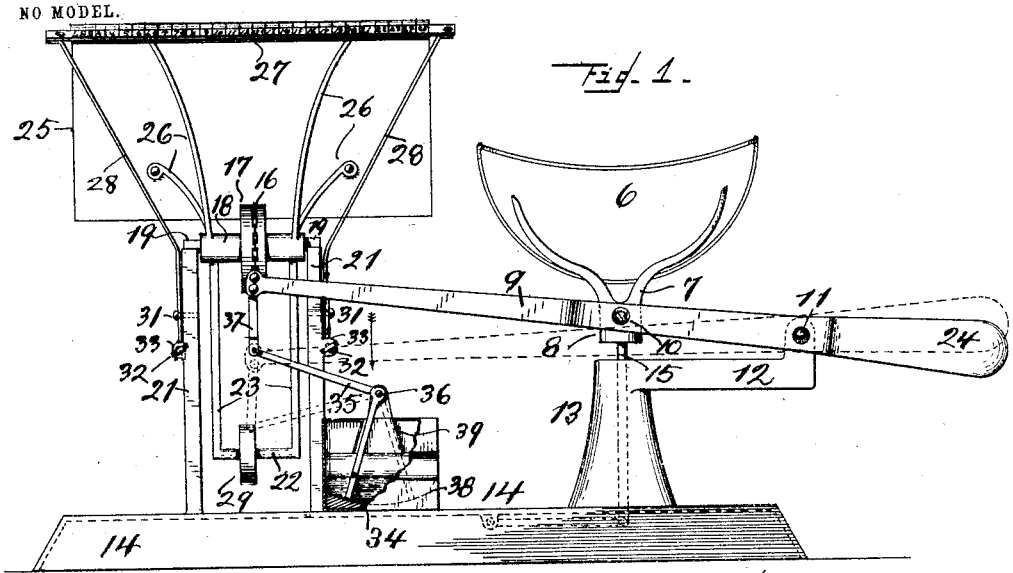

No. 776,715. PATENTED DEC. 6, 1904.
R. D. H. ANDERSON.
COMPUTING SCALE.
APPLICATION FILED JAN. 19, 1903.
NO MODEL.

Witnesses
C. G. Schmidt
Arthur Kline

Inventor
Robert D. H. Anderson
by C. Spengel atty.

No. 776,715. Patented December 6, 1904.

UNITED STATES PATENT OFFICE.

ROBERT D. H. ANDERSON, OF CINCINNATI, OHIO, ASSIGNOR TO THE CINCINNATI BUTCHERS SUPPLY CO., A CORPORATION OF OHIO.

COMPUTING-SCALE.

SPECIFICATION forming part of Letters Patent No. 776,715, dated December 6, 1904.

Application filed January 19, 1903. Serial No. 139,569. (No model.)

*To all whom it may concern:*

Be it known that I, ROBERT D. H. ANDERSON, a citizen of the United States, residing in the city of Cincinnati, in the county of Hamilton and State of Ohio, have invented certain new and useful Improvements in Computing-Scales; and I do declare the following to be a clear, full, and exact description thereof, attention being called to the accompanying drawings, with the reference characters marked thereon, which form also a part of this specification.

This invention relates to scales provided with mechanism which operates so that the act of using the scale for weighing by merely placing on it a quantity of a certain article or kind of merchandise computes also automatically the cost or total value of the particular quantity so placed on it, according to or as based upon the price of said merchandise for a fixed unit, which is usually a pound. It also shows the weight of this particular quantity, either directly by observable graduations or indirectly by figuring it out from the total value shown, using the price per unit, which is known, as a factor.

It relates more particularly to that species of such scales which are known as "pendulum-scales" and where a pendulating weight operating in conjunction with the scale-beam and other necessary attachments produces the desired result.

The invention consists of certain improvements in the mechanical construction of such a scale and of the arrangement of its parts, all of which results in a more reliable operation, as well as of a simplified construction, accompanied by a greatly-reduced manufacturing cost.

In the following specification and particularly pointed out in the claims following is found a full description of the invention, together with its manner of use, operation, parts, and construction, which latter is also illustrated in the accompanying drawings, in which—

Figure 2:
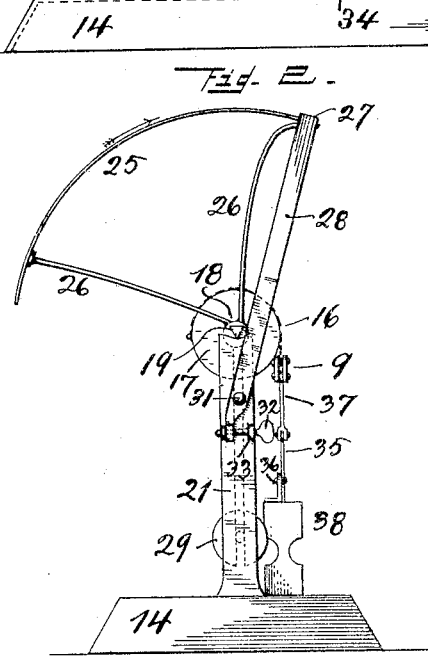
Figure 3:
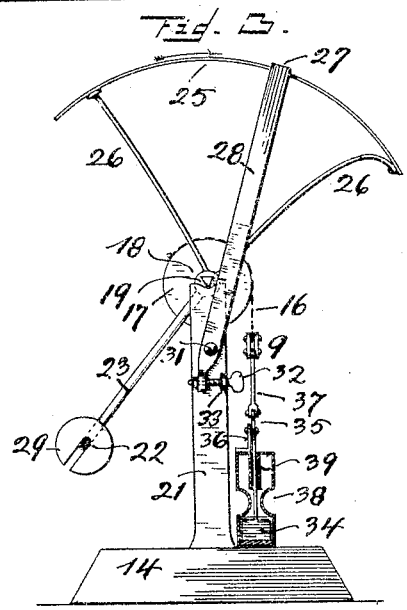
Figure 4:
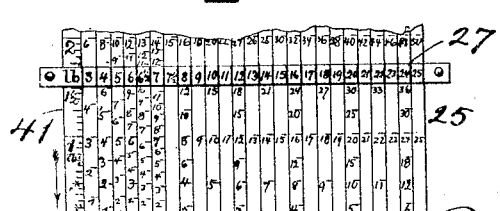

Figure 1 is a front view of the entire scale constructed according to the plan contemplated by my invention. Fig. 2 is an end view of Fig. 1, showing the parts in their normal position. Fig. 3 in a similar view shows the parts in the changed position which they undergo during operation. Fig. 4 illustrates the manner of operation of the cost-indicating and value-computing devices.

6 is a conventional scale-pan, which receives the matter to be weighed. It is carried on a supporting-frame 7, the lower part 8 of which rests on the scale-beam 9, passing through an opening in a laterally-enlarged part thereof, and is supported thereon by customary pivots 10. Other pivots 11 support the scale-beam on a bracket 12, projecting from a hollow standard 13, which rises from base 14. The object in having this standard located laterally with reference to bracket 12 is for the purpose of utilizing it to receive a rod 15, the lower end of which is usually weighted or connected by a link to the interior of the hollow base, the function of this expedient, customary in scales, being to maintain the scale-pan in a horizontal position during the vibrations of the scale-beam. In place of the scale-pan 6 other equivalent means may be provided on the scale-beam for supporting the matter to be weighed.

None of the parts so far described are considered as new.

In order to enable me to combine my price-indicating, value-computing, and weight-showing attachments and devices with a scale of this kind, I first extend the scale-beam in one direction to the left, as shown in this case. This particular end I attach, by means of a flexible connection 16, (chain or cord,) to a pulley 17, rigidly connected to a rock-shaft 18. This latter by suitable pivots 19 at its ends is supported in bearings formed in the upper ends of posts 21. Rock-shaft 18, with pulley 17, is held in a certain position by a weight 22, suspended on said shaft by means of frame-arms 23, rigid therewith, said weight and frame constituting the so-called "pendulum" or "pendulum-swing" characteristic with this type of scales. These parts, together with the length of flexible connection 16, which partly encircles the pulley, are so arranged as to hold the connected end of the scale-beam and pan 6 in their highest position with this latter ready to be used for weighing, and all of which constitutes the normal position of the parts, as shown in Fig. 1. The pendulum-weight 22, which holds these parts in this position with flexible connection 16 wound partly over the periphery of pulley 17, may be assisted in such function by a counterweight at the other end of the scale-beam, which effect may be attained by simply enlarging the bulk of the beam thereat and as shown at 24. It will now be seen that loading of the scale-pan and depression of the scale-beam will cause an unwinding of flexible connection 16 from pulley 17 and corresponding partial rotation of rock-shaft 18 proportional in extent to the weight of the matter in the scale-pan. This condition I utilize for the operation of the value or total-cost computing and weight-showing attachments, one of the complementary parts of which is attached to the movable parts affected by this depression of the scale-beam, rock-shaft 18 being so used. This one particular part consists of a shell 25 in shape of a cylindrical segment supported on arms 26, projecting from the rock-shaft, so as to be concentric with the center of rotation of this latter. The other complementary part of the computing attachment consists of a flat bar 27, supported in a stationary position closely above shell 25 and in such a manner that this latter may swing back and forth under the same. This bar is supported on arms 28, attached to base 14 by means of posts 21, and is provided with numbers indicating prices per weight unit, which latter is usually a pound.

On the outer side of shell 25 and arranged at right angles to bar 27, which indicates prices, there are parallel lines and rows of graduations with accompanying figures, one row for each number on the price-bar, and which figures indicate computed costs or total values of pluralities or fractions of weight units of the matter to be sold and contained in the scale-pan. These figures are read in conjunction with a particular number on the price-bar, which number indicates the price per pound of the particular merchandise contained in the scale-pan, such price being of course known. These total-value figures may be read either as they arrive opposite the upper or lower edges of the price-bar, according to previous adjustment, and must of course thereafter be always read in the same position. The graduations and figures on this shell may be applied directly to the outer side of it or to a chart, which latter is affixed to the outside of the former.

The adjustments, arrangements, and relation of all parts to each other of weight 24 with reference to scale-pan 6, but more particularly of the pendulum-weight with reference to shell 25, is such that all parts are held in a normal position, as shown in Figs. 1 and 2, with the figures to be read in convenient position for the eye. This means, further, as to the parts of the computing attachment that the edge of the price-bar and the lowest figures or zero-marks on the cost-chart are normally in line with each other.

The computing capacity of the chart may be increased by weights added to the pendulum, one being shown at 29. If such are used, they should by preference bear a certain fixed relation to the registering capacity of the chart—that is, as to the operation of the same for showing values in order to facilitate quick computation—and therefore I suggest that by preference each of such added weights is heavy enough to equal—that is, offset—the total registering capacity of the chart. It is then only necessary in a scale of four pounds' capacity, for instance, to add four pounds or the value of four pounds to the matter shown by the chart for each additional weight hung onto the pendulum.

Since the pendulum with the affixed chart seeks always to swing into a position which is in the plumb and in which position it normally remains, it is clear that the price-bar must always meet this normal position, so as to be in proper position at the beginning of operations with reference to the zero or starting point on the chart. This presumes always a level surface for base 14 to rest upon. For cases where such is not readily attainable and to do away with the necessity of blocking up the base, otherwise usually resorted to, I provide ready and simple means for such adjustment arranged as follows: Instead of attaching arms 28 absolutely rigid to posts 21 I secure them by a single screw or pivot 31 and in a manner permitting them to turn thereon. One or both arms are extended below this point of their attachment, which extension is fork-shaped or has an opening to receive the end of an adjusting-screw 32, seated in a tapped lug 33, projecting from posts 21. The lower end of arm 28 is held to screw 32 between two shoulders near the end of this latter, so that when said screw is turned arms 28 will move with it either way. These shoulders may be obtained by reducing the end of the screw which passes through the opening in the lower end of arms 28 and by forming a head or having a washer on the other side. A ready means to adjust the price-bar with reference to the computing-chart is thus provided.

In order to check the vibration of the scale-beam and chart quickly to permit reading of this latter as soon as possible, I use the resistance which a liquid presents to the passage through it of a flat surface attached so as to move with one of the moving parts, the scale-beam preferred, and thereby retarding the motion. This flat surface consists of a paddle 34, carried at one end of an angle-lever 35, pivoted at 36 and having its other end attached by means of a connecting-link 37 to scale-beam 9. It will now be seen that vibration of the scale-beam also causes this paddle to oscillate, and, inversely, any resistance offered to this paddle will be transmitted to the scale-beam. This resistance is provided by a suitable liquid, which may be an oil, and is contained in a suitable receptacle or dash-pot 38 and through which said paddle swings. To increase this resistance, this receptacle is contracted above the paddle by an approach of its opposite sides, so that in addition to displacing the liquid the same must also be forced through this restricted space between the sides before it will yield to the paddle. The angle-lever above this restricted part and below the liquid-tight closed top of receptacle 38 swings inside of a well 39, depending from the under side of the top. In case the scale is upset this well by having its lower mouth above the liquid prevents the same from spilling through the slot in the top.

The operation of the scale and use of the chart are best gleaned from Fig. 4. A quantity of a certain merchandise to be weighed has caused the chart to swing forward under the price-bar. As now shown and supposing the merchandise to be worth ten cents a pound, the value of the quantity contained in the scale-pan would be fifteen cents, as shown by the figure "15," which has come to a stop below numeral "10" on the price-bar. At the same time graduations "41" at one edge of the chart show this quantity to be one pound and a half, so that not only the valve of the merchandise becomes known, but also the quantity thereof as expressed in weight units. It will thus be seen that in using the scale merchandise may be sold either according to value or to quantity—that is, weight—that is to say, if the buyer would ask for fifteen cents' worth of a merchandise worth ten cents a pound the seller would watch until figure "15" appears opposite the number "10" on the price-bar. If the buyer would ask for a pound and a half of merchandise worth ten cents a pound, the seller watches until the graduation at "41" would indicate a pound and a half by coming to a stop under the bar. The substance and result of the transaction is in each case the same, no matter in what form the demand for the sale of the goods is made or how such sale is executed on the scale.

The parts are very conveniently arranged, the scale-pan, as well as the chart, being each right before the user, and the figures to be read on the chart appear always in the same position—that is, at the same height—they being in line with the price-bar, and to which position the eye becomes soon accustomed, so that the figures may be quickly caught.

Owing to the limited scale of the drawings, no attempt has been made to show all the graduations on the chart and price-bar, which in the actual device are much more complete.

It is clear as far as their mechanical functions are concerned that pulley 17 and rock-shaft 18 may be considered as one element. Thus, for instance, if the rock-shaft were of sufficient thickness chain 16 could be attached to it without the intermediate pulley; or, differently considered, it being unnecessary to have the material of the rock-shaft on either side of the chain as thick as the pulley, the material has been cut down and shaped into the rock-shaft and pivots.

Having described my invention, I claim as new—

1. In an automatic computing-scale, the combination of a pivoted scale-beam provided with means to support the matter to be weighed, a cylindrical shell with a value-indicating chart on its outer side, a rock-shaft on which it is mounted, a price-bar supported in a fixed position above the chart mentioned and parallel thereto, operative connection between the scale-beam and the rock-shaft whereby vibration of the former actuates this latter and causes shell and chart to oscillate and a pendulating-weight depending from the rock-shaft consisting of arms 23, 23 and member 22, carried between their ends, the latter adapted to support additional weights.

2. In an automatic computing-scale, the combination of two complementary members comprising the computing means, one being supported in a fixed position, the other being free to oscillate in close proximity thereto, a scale-beam, operative connection between it and the oscillating member, whereby vibration of the former causes oscillation of this latter, a pivotally-supported paddle, a receptacle into the lower part of which it is fitted and which is contracted above such paddle and operative connection between this paddle and the scale-beam whereby vibration of this latter causes the former to oscillate within the receptacle, enabling a liquid contained in this latter to retard such movement.

3. In an automatic computing-scale, the combination of a pivoted scale-beam provided with means to support the matter to be weighed, a cylindrical shell with a value-indicating chart on its outside, pivots on which it is mounted, operative connection between it and the scale-beam whereby vibration of this latter causes said shell to oscillate, a weight which opposes these movements and holds these parts in a certain normal position, a price-bar supported in a fixed position with reference to the oscillating shell and in parallel relation thereto and supports to which this bar is adjustably attached and in a manner to permit adjustment of it with reference to the normal position of the value-indicating chart on the shell mentioned.

4. In an automatic computing-scale, the combination of a scale-beam supporting a scale-pan, with a price-indicating and value-computing outfit, both arranged side by side, this outfit consisting of two complementary members of which one is a bar bearing numerals which indicate prices per weight unit, the other being a cylindrical shell bearing figures which indicate computed values, means whereby this shell is supported below the price-bar and in a manner to be free to oscillate with reference to this bar and in a direction at right angles thereto, supports for this bar whereby the same is held parallel to the plane in which the scale-beam is vibrated and in a fixed position before the eyes of the observer across said shell and across the field of vision, so that the points of observation on the movable shell remain on and are seen always at the same level and together with the scale-pan may be simultaneously observed, weight-controlled mechanism and means operatively connecting the same with the shell and scale-beam.

In testimony whereof I have signed my name to this specification in the presence of two subscribing witnesses.

ROBERT D. H. ANDERSON.

Witnesses:
WARREN M. CLAWSON,
MARK A. POWERS.